Figures 1, 2:
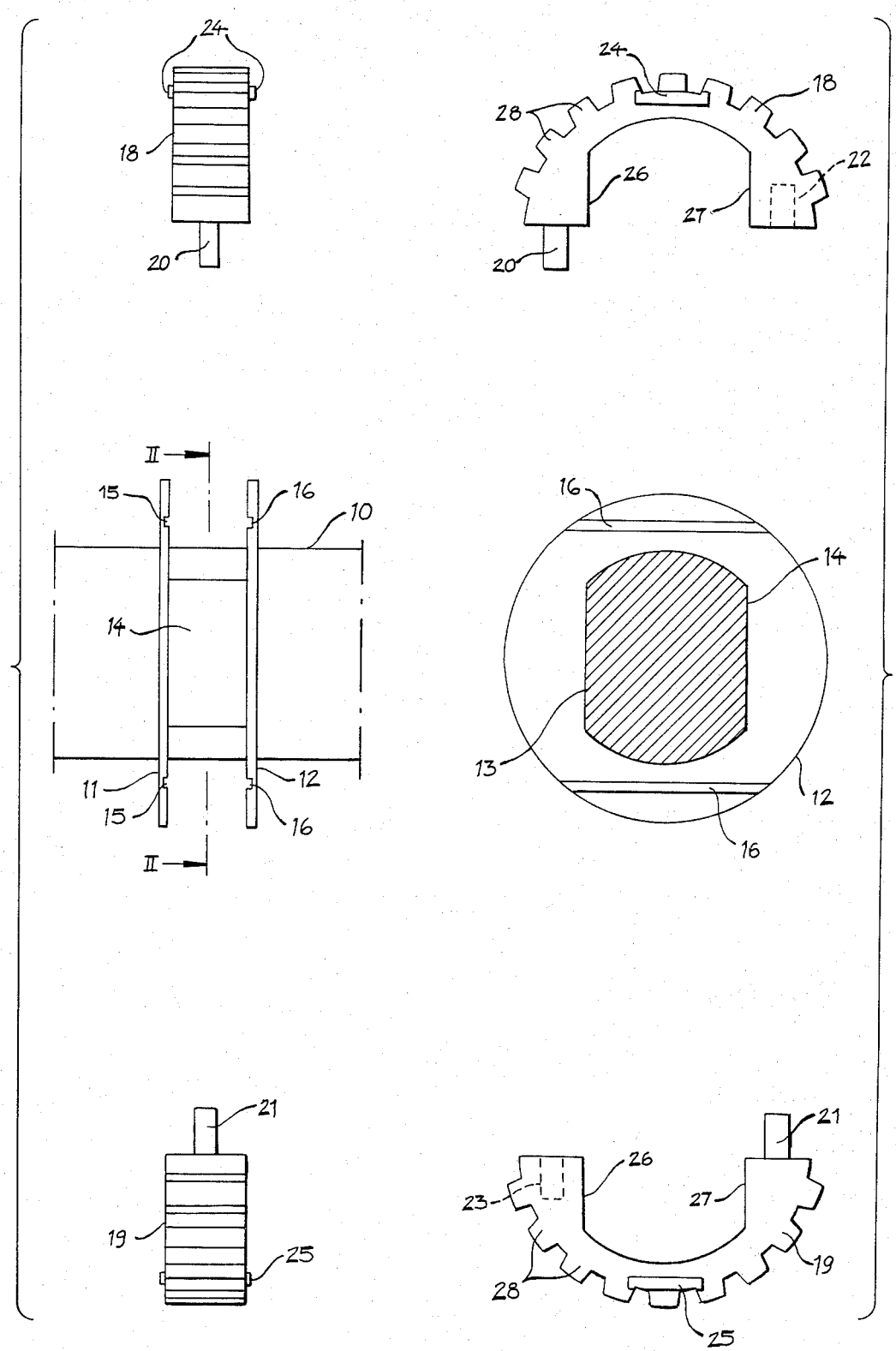

United States Patent [19]

Francke et al.

[11] Patent Number: 4,506,559

[45] Date of Patent: Mar. 26, 1985

[54] SPLIT PULLEY

[75] Inventors: Kurt O. Francke, Huddinge; Sten T. Strand, Nynäshamn, both of Sweden

[73] Assignee: Aktiebolaget Electrolux, Stockholm, Sweden

[21] Appl. No.: 438,893

[22] PCT Filed: Feb. 9, 1982

[86] PCT No.: PCT/SE82/00035

§ 371 Date: Oct. 25, 1982

§ 102(e) Date: Oct. 25, 1982

[87] PCT Pub. No.: WO82/03110

PCT Pub. Date: Sep. 16, 1982

[30] Foreign Application Priority Data

Mar. 10, 1981 [SE] Sweden .................. 8101482

[51] Int. Cl.³ .................. F16H 55/12; B21D 53/28; B21H 5/00; B25G 3/00
[52] U.S. Cl. .................. 74/439; 74/448; 74/450; 474/95; 27/159.2; 403/344; 403/383
[58] Field of Search .................. 403/344, 360, 383; 74/439, 450, 448; 474/96, 95, 902; 29/159.2, 463, 453

[56] References Cited

U.S. PATENT DOCUMENTS

| | | | |
|---|---|---|---|
| 406,287 | 7/1889 | Kehler | 403/344 |
| 536,696 | 4/1895 | Hirsh | 403/344 |
| 732,111 | 6/1903 | Perkins | 403/344 |
| 937,111 | 10/1909 | Sparr | 403/344 |
| 3,005,356 | 10/1961 | Gandrud | 474/96 |
| 3,106,101 | 10/1963 | Harriman | 403/381 |
| 3,159,047 | 12/1964 | Dable | 74/450 |
| 4,031,769 | 6/1977 | Kassing | 474/162 |
| 4,043,214 | 8/1977 | Westlake | 474/162 |
| 4,253,344 | 3/1981 | Kerklies | 29/463 |

*Primary Examiner*—Lawrence J. Staab
*Assistant Examiner*—Michael David Bednarek
*Attorney, Agent, or Firm*—Alfred E. Miller

[57] ABSTRACT

The invention proposes to form the flanges (11,12) of a driving pulley as a part of the driving shaft (10), for example by moulding the shaft (10) and the flanges (11,12) so as to constitute one unit, the portions (18,19) of the driving pulley being attachable between the said flanges (11,12).

4 Claims, 2 Drawing Figures

SPLIT PULLEY

The present invention relates to a driving pulley arranged on an essentially cylindrical rotary shaft which is provided, at its ends, with pins for supporting the shaft.

In earlier known arrangements a pulley was formed as a separate unit which was placed on the shaft during assembly, and fixed there by riveting, screwing, or other suitable procedure. Alternatively the pulley consisted of two halves screwed to each other by bolts and in that manner were attached to the shaft. These pulleys were used mainly for transmitting larger forces.

These devices have a complicated construction and are troublesome to assemble. Further, they demand close tolerances during manufacturing so that the shaft will not jam during assembly and thus be exposed to defective load or in extreme cases to become bent.

The purpose of the invention is to eliminate the above drawbacks and to provide a driving pulley wherein the shaft and the flanges of the pulley can be adapted in one piece and in which the following assembly work is simplified. The purpose has been achieved by the device according to the invention obtaining the characteristic features set forth hereinafter.

Further advantages of the invention will be obvious in the following description of an embodiment in connection with the accompanying drawing wherein FIG. 1 is a schematic bottom view of a portion of a shaft having the flanges of the driving pulley, FIG. 2 is a section along the line II—II in FIG. 1 which in addition shows both portions of the driving pulley before the assembly.

The shaft, as a whole designated by 10, has two radial flanges 11,12. Outside the flanges the shaft in the embodiment is cylindrical but in the space between the flanges it has two diametrically located plane or flat surfaces 13 and 14 for providing a non-rotatable connection between the driving pulley and the shaft. Naturally, any other suitable profile would be fully conceivable to achieve the above-stated objective. In the surfaces facing each other on the flanges 11 and 12 notches 15 and 16 are formed, said notches being essentially perpendicular in relation to the plane surfaces 13 and 14.

The driving pulley 17 comprises two identical semicircular portions 18 and 19 each of them being separately in place in the space between the flanges 11 and 12. Each portion 18 and 19 is at its one end provided with a steering pin 20 and 21 respectively which during the assembly of the parts are intended to fit into corresponding grooves 22 and 23 respectively at the other ends of the portions 18 and 19.

On the side walls of the driving pulley 17 elevations 24 and 25 are adapted which, during the assembly of the portions 18 and 19 snap into notches 15 and 16 and lock the portions 18 and 19 in place between the flanges 11 and 12. In addition, each portion 18 and 19 has on its inside two opposed plane surfaces 26 and 27 the extension of which being half the length of the plane surfaces 13 and 14, so that when the portions 18 and 19 have been placed between the flanges 11 and 12 a non-rotatable connection is achieved between the driving pulley 17 and the shaft 10. A driving belt grips into teeth 28 adapted in the periphery of the driving pulley 17 for transmission of power from a driving member. Both the shaft 10, flanges 11 and 12 delivered with a profile between the flanges, and the notches 15 and 16 can be molded for instance, of plastics. In the same manner, the parts 18 and 19 of the driving pulley 17 together with the steering pins 20 and 21 and the grooves 22 and 23 are manufactured by the same procedure, which decreases the manufacturing costs. By this arrangement, on one hand the assembly of the driving pulley is simplified, and on the other hand, gluing, welding, or other means for attaching the driving pulley to the shaft is superfluous.

The invention is not intended to be limited to the embodiment shown but several modifications are conceivable within the frame work of the invention, as characterized in the following claims.

We claim:

1. In an arrangement provided with a substantially cylindrical rotatable shaft having pins at the ends of said shaft for supporting the same, the improvement comprising: spaced integral flanges on said shaft, two diametrically opposed plane surfaces on said shaft positioned between said flanges, a driving pulley, corresponding profile surfaces on the inside of the driving pulley for effecting non-rotatable connection between said shaft and said driving pulley, said driving pulley constituting a unit with said shaft and including two identical semicircular portions which are mounted on said shaft between said flanges, and said flanges being provided with notches on surfaces thereof facing each other, and protruding elements formed on the inner side walls of said portions which are adapted to snap into said notches during assembly of the driving pulley on said shaft.

2. The arrangement as claimed in claim 1 wherein each part of the driving pulley has at one end a projecting pin, said driving pulley having grooves into which said projecting pins are inserted so that said identical semicircular portions can be assembled on said shaft in a non-rotatable condition.

3. The arrangement as claimed in claim 1 wherein both said shaft and said flanges are molded in one piece.

4. The arrangement as claimed in claim 1 wherein said parts of the driving pulley are fabricated of a plastic material.

* * * * *